Jan. 19, 1926.  1,570,389
R. MORGENIER
PROCESS OF TREATING SEED HULLS AND PRODUCT
Filed Dec. 7, 1920
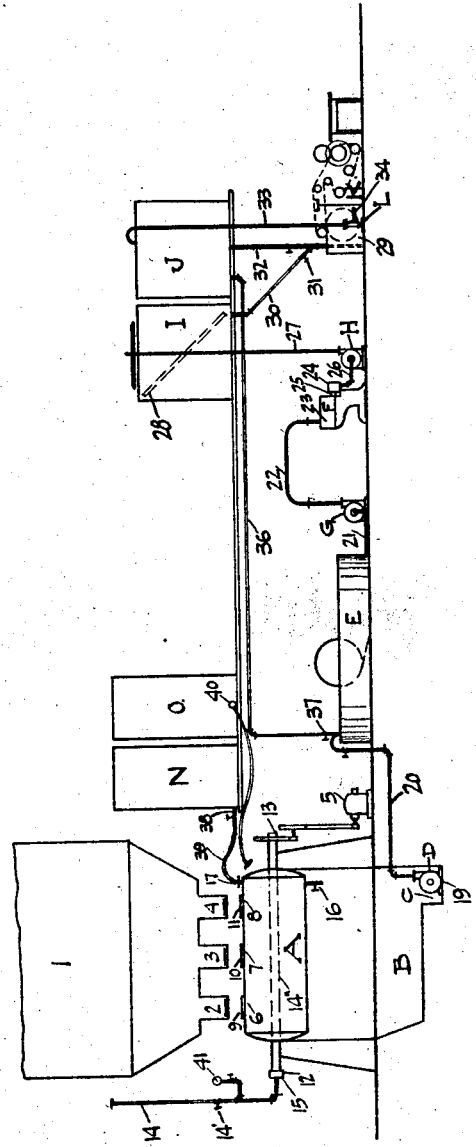
WITNESS:
H. Sherburne
INVENTOR:
Robert Morgenier
By White Prost & Evans
his ATTORNEYS.

Patented Jan. 19, 1926.

1,570,389

UNITED STATES PATENT OFFICE.

ROBERT MORGENIER, OF OAKLAND, CALIFORNIA, ASSIGNOR OF ONE-SIXTH TO GREGG A. RUSSELL AND ONE-HALF TO HUGH C. RUSSELL, BOTH OF OAKLAND, CALIFORNIA.

PROCESS OF TREATING SEED HULLS AND PRODUCT.

Application filed December 7, 1920. Serial No. 428,870.

*To all whom it may concern:*

Be it known that I, ROBERT MORGENIER, a citizen of the United States, residing in the city of Oakland, in the county of Alameda and State of California, have invented new and useful Improvements in Processes of Treating Seed Hulls and Product, of which the following is a specification.

This invention relates to the conversion of seed hulls, such as rice hulls, or other pecto-cellulose matter, into pecto-fiber and other products, suitable for making paper, board and other products.

An object of the invention is to produce the conversion of pecto-cellulose matter into pecto-fiber cheaply and at the same time impart to such product valuable properties not possessed by other fibers of a ligno-cellulose base.

A further object is to greatly increase the yield of pulp from such hulls by conserving and uniting the pectose with the cellulose so that when these are reduced by means of a beater, a much greater yield of fiber will result; such fiber being a composite of pectose and cellulose and not of cellulose alone, as has heretofore resulted.

Another object is to produce a valuable by-product, viz, silicate of soda from such hulls, by combining the silica contained in the hulls with sodium. The percentage of silica in rice hulls varies according to the vicinity in which the rice is grown, California rice hulls containing about 1.152 per cent of silica.

The invention possesses other advantageous features, some of which, with the foregoing, will be set forth at length in the following description, where I shall outline in full the preferred form of the process of my invention and describe the resultant product.

The process of my invention is applicable to pecto-cellulose matter, such as seed hulls, and in the following description I shall outline the process as performed in the treatment of rice hulls. In accordance with my invention, I charge a digester or container full of the hulls, then close the container and introduce steam into the container until a pressure of about two pounds per square inch is produced, at the same time agitating the hulls, so that the steam has access to all of the hulls. When this condition is reached, the inflow of steam is interrupted and the contents of the receptacle permitted to cool, producing a reduction of pressure or partial vacuum in the container, due to the condensation of the steam. The container is then filled to the steam line with 10° Baumé sodium hydroxide solution and then the container is slowly rotated, at about two revolutions per minute and simultaneously steam is admitted to the container. This is continued for about two hours, the temperature in the container gradually rising with the pressure, which, at the end of said period, will approximate 110 pounds per square inch. This produces a slow cooking and leaching of the hulls with the weak alkaline solution and causes the pectine contents of the hulls to swell and permit the silica contained therein to combine with the sodium hydroxide, forming silicate of soda. This solution is now drawn off and a fresh charge of the sodium hydroxide solution introduced and steam again admitted. After cooking one hour, the solution is again drawn off. After that, the hulls are steamed for about 30 minutes, with steam under pressure of from 60 to 80 pounds. The more frequently the cooking solution in the receptacle is changed, the more thoroughly will the silica be removed from the hulls. The cooking process results in the removal of the silica and not the pectose and allows the drained and cleared pectose to remain with the fiber of the hulls, whereby a strong fiber is produced in the process of beating. In this process, therefore, there is produced a pecto-fiber in contradistinction to other fiber process in which the ultimate fiber is laid bare and all glutinous materials removed. Further, the present process results in the production of a solution of silicates of soda which has a value substantially equal to the alkaline solution used. The pectose is insoluble and has great surface tension so that it does not flow out with the solution, but remains with the hulls. The hulls consist practically entirely of silica and carbohydrates and contain practically no other ingredients which are soluble in the alkali solution.

When desired, the hulls may be bleached by introducing chlorine into the container, usually by adding a water solution of chlorine gas, with steam at about 10 pounds pressure and the degree of bleaching is determined by the amount of chlorine introduced, the pressure of the steam and the time of contact. The chlorine also combines with the sodium hydroxide, forming sodium chloride, which causes coagulation of the pectose further preventing its discharge. The hulls are now soft and flaccid and are practically free from silica and silicates and may be readily beaten into a more or less fine pulp. For this purpose they are mixed with water and charged into a beater, where continued "long" beating will result in a fine and very strong pulp, or quick "sharp" beating will result in a coarse short pulp, similar to the pulp ordinarily used in "straw board." After beating, the pulp may be bleached in the beater, then screened and formed into sheets in suitable apparatus.

On the drawing accompanying this specification and forming a part hereof, I show a preferable arrangement of mechanism for carrying out my process, which arrangement consists of a storage bin 1, with feed spouts 2, 3, 4, overhanging the longitudinal center of a rotary cooking boiler A—the spouts leading to charging openings 6, 7, 8, formed in the cylindrical part of the boiler A, which are provided with steam-tight, removable doors 9, 10, 11. The boiler A is revolvable on trunnions 12, 13 consisting of a hollow shaft with journaled ends and perforated in the part thereof internally of the boiler.

The trunnion end 12 rotates in a bearing and a steam pipe 14 with valve 14' enters such end 12. A steam tight joint for such pipe 14 is provided by a stuffing box 15 mounted at the extreme end of trunnion 12.

On trunnion 13, revolvable in bearings, I mount a train of gears operated by a motor 5, which, when set in motion will slowly rotate the boiler A. On the lower side of boiler A I form a discharge valve 16, and upon the upper side I mount a hose connection 1 and vent valve 17. On the steam pipe 14, I mount the steam control valve 14' aforesaid. Under the boiler A, I form a receiving pit B, into which the contents of boiler A may be emptied. In a sump C formed in pit B, I set a pump D with a suction opening 19 and a discharge pipe 20 leading into a pulp beating engine E and near such engine E I mount a standard flap pulp screen F and between the beater and screen I place a pump G, which is connected by pipe 21 to the beater E and a discharge pipe 22 leads to and discharges into the vat 23 of the screen F.

To a discharge box 24, connected by ducts 25 chambers under the screen plates of screen F, I connect a discharge pipe 26 which connects with the suction end of a pump H. A discharge pipe 27 of said pump overhangs and discharges into an agitator tank 1 and within the tank 1 is a mechanical agitator 28 by means of which its contents are kept in motion. Adjacent the tank 1 is a tank J, the purpose of which will be described immediately hereinafter. Near the screen F, I place a standard wet machine K into the cylinder vat 29 of which a stock pipe 30 with shut-off valve 31 leads from the lower end of the stock tank 1, and into said vat 29 also leads a valve fitted water discharging pipe 32. From one side of the cylinder vat 29 concentrically of the cylinder, I lead a water discharge pipe 33, which connects to the suction end of a pump L, which by a discharge pipe 34 empties into the return water tank J. From the tank J a return water pipe 36 with a valve 37 leads back and empties into the beater E.

Above the rotary boiler A and to one end thereof, I locate a sodium hydroxide solution tank N, removably connected by a hose connection 38 and hose 39 to the hose connection of the boiler A.

Adjacent tank N, I place a chlorine tank O with a hose connection 40 and valve interchangeably connectable to the boiler A by its union with the valve 17 of the boiler. The entire arrangement of tanks and valves is such that either tank may be connected respectively or all connection between tanks and the boiler may be cut off.

I claim:

1. The process of making paper pulp from rice hulls, which comprises cooking the hulls in a 10° Baumé solution of sodium hydroxide for about two hours, removing the liquor from the mass and beating the mass to a pulp.

2. The process of making paper pulp from rice hulls, which comprises cooking the hulls in a solution of sodium hydroxide for a sufficient time to convert the silica in the hulls to sodium silicate and convert the pecto-cellulose into pecto-fiber, separating the liquor from the mass and beating the mass to a pulp.

In testimony whereof, I have hereunto set my hand.

ROBERT MORGENIER.